(12) United States Patent
Brown et al.

(10) Patent No.: US 7,565,799 B2
(45) Date of Patent: Jul. 28, 2009

(54) CONTROLLING LEAN NOX TRAP (LNT) CATALYST PERFORMANCE

(75) Inventors: David B. Brown, Brighton, MI (US); Michael J. Paratore, Jr., Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 579 days.

(21) Appl. No.: 11/053,966

(22) Filed: Feb. 9, 2005

(65) Prior Publication Data
US 2006/0174610 A1    Aug. 10, 2006

(51) Int. Cl.
*F01N 3/00* (2006.01)

(52) U.S. Cl. .............. 60/295; 60/274; 60/276; 60/285; 60/297; 60/303

(58) Field of Classification Search ........ 60/274, 60/285, 297, 300, 301, 303, 276
See application file for complete search history.

(56) References Cited

U.S. PATENT DOCUMENTS

| | | | | |
|---|---|---|---|---|
| 5,595,060 A | * | 1/1997 | Togai et al. | 60/274 |
| 5,735,119 A | * | 4/1998 | Asanuma et al. | 60/276 |
| 5,740,669 A | * | 4/1998 | Kinugasa et al. | 60/285 |
| 5,894,725 A | * | 4/1999 | Cullen et al. | 60/274 |
| 5,996,338 A | * | 12/1999 | Hirota | 60/285 |
| 6,018,943 A | * | 2/2000 | Martin et al. | 60/274 |
| 6,105,365 A | * | 8/2000 | Deeba et al. | 60/274 |
| 6,134,883 A | * | 10/2000 | Kato et al. | 60/274 |
| 6,182,443 B1 | * | 2/2001 | Jarvis et al. | 60/274 |
| 6,490,856 B2 | * | 12/2002 | Bidner et al. | 60/274 |
| 6,497,092 B1 | * | 12/2002 | Theis | 60/274 |
| 6,763,657 B2 | * | 7/2004 | Wachi et al. | 60/285 |
| 2004/0211171 A1 | * | 10/2004 | Nakagawa et al. | 60/285 |
| 2004/0255577 A1 | * | 12/2004 | Toshioka et al. | 60/285 |

FOREIGN PATENT DOCUMENTS

JP        04-359145 A    * 12/1992

* cited by examiner

*Primary Examiner*—Tu M Nguyen

(57) ABSTRACT

A method of using a lean NOx trap (LNT) catalyst to control vehicle engine emissions. While catalyst temperature is within a low range, the catalyst is allowed to store NOx until the catalyst is saturated. The saturated catalyst is heated to a temperature exceeding the low range. The heated catalyst is regenerated. This method can improve LNT catalyst performance at low temperatures while promoting fuel economy.

19 Claims, 2 Drawing Sheets

CONTROLLING LEAN NOX TRAP (LNT) CATALYST PERFORMANCE

FIELD OF THE INVENTION

The present invention relates generally to vehicle emission control systems and methods, and more particularly to using lean NOx trap (LNT) catalysts to control vehicle emission.

BACKGROUND OF THE INVENTION

Lean NOx trap (LNT) catalysts, also known as NOx absorbers, are being developed to enable lean burn engines to meet challenging global emission standards. Although these catalysts show promise, they also present a number of engineering challenges. For example, LNT catalysts may perform poorly at the low operating temperatures that are typical of present-day diesel engines. LNT catalysts have been found to reduce NOx insufficiently at low temperatures to provide the emission control needed to meet stringent emission standards for such vehicles.

SUMMARY OF THE INVENTION

The present invention, in one implementation, is directed to a method of using a lean NOx trap (LNT) catalyst to control vehicle engine emissions. While a temperature of the catalyst is within a predetermined low temperature range, the catalyst is allowed to store NOx until the catalyst is substantially saturated. The substantially saturated catalyst is heated to a temperature exceeding the low range. The method also includes regenerating the catalyst, when it has been heated to the optimal thermal range.

In another implementation, the invention is directed to a method of using a lean NOx trap (LNT) catalyst to control vehicle engine emissions. It is determined whether a temperature of the catalyst is in a predetermined low temperature range and whether the catalyst is adsorbing NOx. Based on the determining step, the catalyst is heated to above the temperature range to condition the catalyst for cleaning.

In another implementation, the invention is directed to a method of using a lean NOx trap (LNT) catalyst to control vehicle emissions. It is determined whether a temperature of the catalyst is in a predetermined low temperature range and whether the catalyst is storing NOx. Based on the determining step, the catalyst is heated to a temperature above the predetermined low range to condition the catalyst for removal of the NOx.

In yet another implementation, a vehicle emission control system includes a LNT catalyst that adsorbs NOx from an exhaust stream produced by an engine of the vehicle. A control module of the vehicle controls heating of the LNT catalyst. While a temperature of the catalyst is within a predetermined low temperature range, the control module allows the catalyst to store NOx until the catalyst is substantially saturated. The control module heats the substantially saturated catalyst to a temperature exceeding the predetermined low range and reduces the stored NOx from the heated catalyst.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
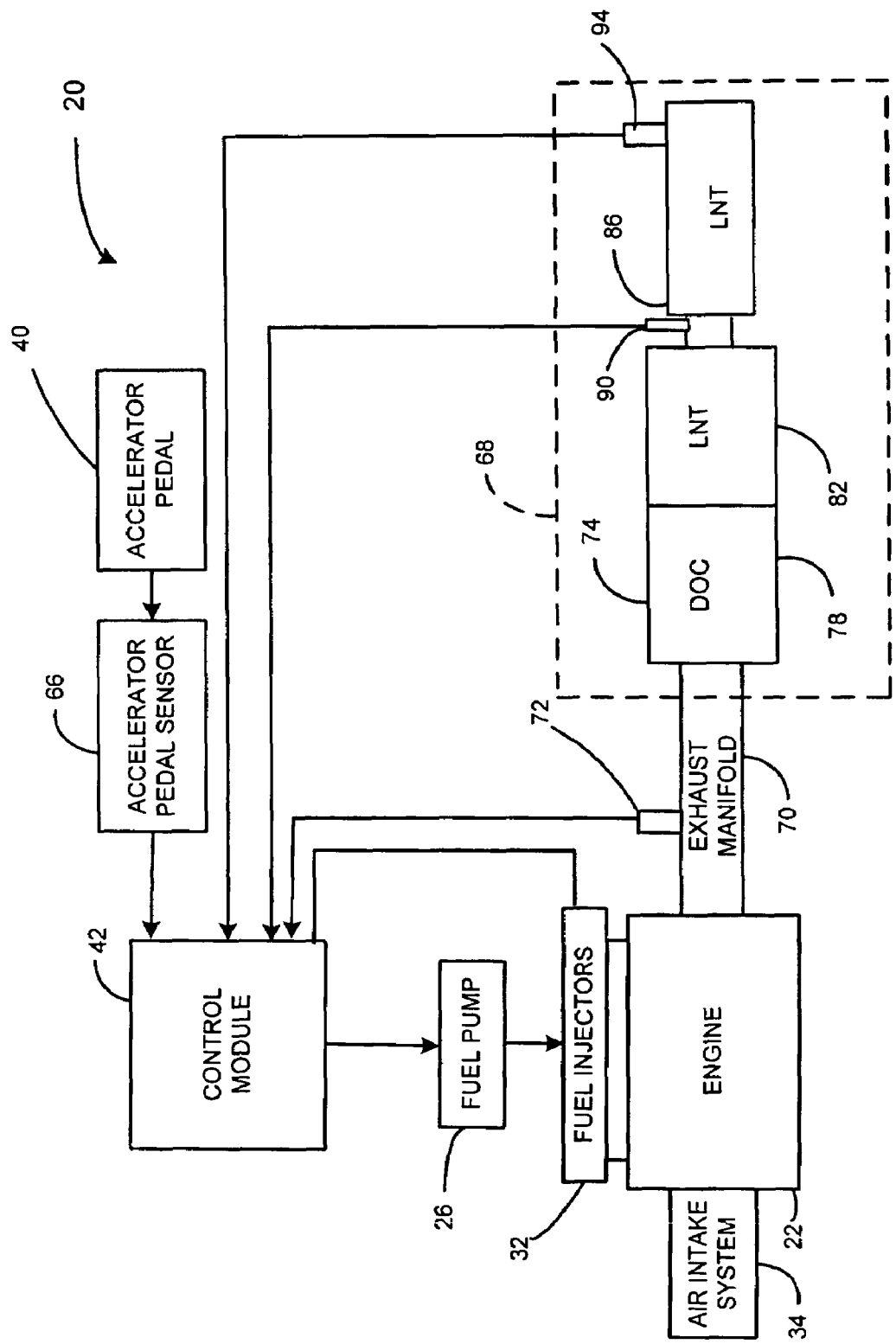
FIG. 1 is a block diagram of a vehicle including an emission control system in accordance with one implementation of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality. Although implementations of the present invention are described herein with reference to one or more vehicles having diesel engines, it should be understood that the invention is not so limited. The invention also can be practiced in connection with engines powered by gasoline and/or other types of fuels.

Generally, various embodiments of the present invention are directed to using LNT catalysts for vehicle emission control. A typical LNT catalyst provides a plurality of channels through which vehicle exhaust passes. Surfaces of the channels are impregnated, for example, with barium salts and platinum or other precious metal(s). During lean operation of the vehicle engine, the catalyst adsorbs oxides of nitrogen (NOx) from engine exhaust. The nitrogen oxides (typically NO and $NO_2$) are stored onto the catalyst surface. The catalyst periodically is exposed to a rich fuel environment, during which the catalyst is regenerated, i.e., the stored NOx is reduced. Specifically, the nitrogen oxides are converted to nitrogen, carbon dioxide and water in the presence of heat, carbon monoxide and hydrocarbons in the exhaust stream.

LNT catalysts can effectively store NOx at temperatures lower than temperatures at which they can effectively reduce the stored NOx. At low temperatures, for example, at temperatures less than about 300 C., a LNT catalyst can store NOx for a limited time, ie., until it becomes full of NOx. In configurations of the prior art, catalyst performance typically drops at low temperatures after the catalyst has become saturated with NOx.

Generally, in various implementations of the invention, a LNT catalyst is heated to raise the catalyst temperature when appropriate to facilitate catalyst performance. In one implementation, while a temperature of the catalyst is within a predetermined low temperature range, the catalyst is allowed to store NOx until the catalyst is saturated. The saturated catalyst is heated to a temperature exceeding the low range, and the heated catalyst undergoes regeneration.

Referring now to FIG. 1, a vehicle including an emission control system in accordance with one embodiment of the present invention is indicated generally by reference number 20. Fuel is delivered to a diesel engine 22 from a fuel pump 26 through a plurality of fuel injectors 32. Air is delivered to the engine 22 through an air intake system 34.

A control module 42 is connected with an accelerator pedal sensor 66 that senses a position of an accelerator pedal 40. The sensor 66 sends a signal representative of the pedal position to the control module 42. The control module 42 uses the pedal position signal in controlling operation of the fuel pump 26 and fuel injectors 32.

A catalytic converter 68 receives exhaust from the engine 22 through an exhaust manifold 70. An exhaust sensor 72 senses exhaust in the manifold 70 and delivers a signal to the control module 42 indicative, for example, of whether the exhaust is lean or rich. The catalytic converter 68 includes a canister 74 having a diesel oxidation catalyst (DOC) in a first section 78 and a lean NOx trap (LNT) in a second section 82. A second canister 86 includes a LNT catalyst. While the engine 22 is operating, engine exhaust passes from the exhaust manifold 70 and through the canisters 74 and 86. In accordance with one implementation of the invention described below, LNT catalyst surfaces inside the canisters 74 and 86 store, i.e., adsorb, oxides of nitrogen (NOx) from exhaust passing through the canisters. A temperature sensor 90 senses temperature in the catalytic converter 68 and sends a signal representative of the temperature to the control module 42. A NOx sensor 94 senses and sends a signal representative of NOx concentration in the canister 86.

Figure 2:
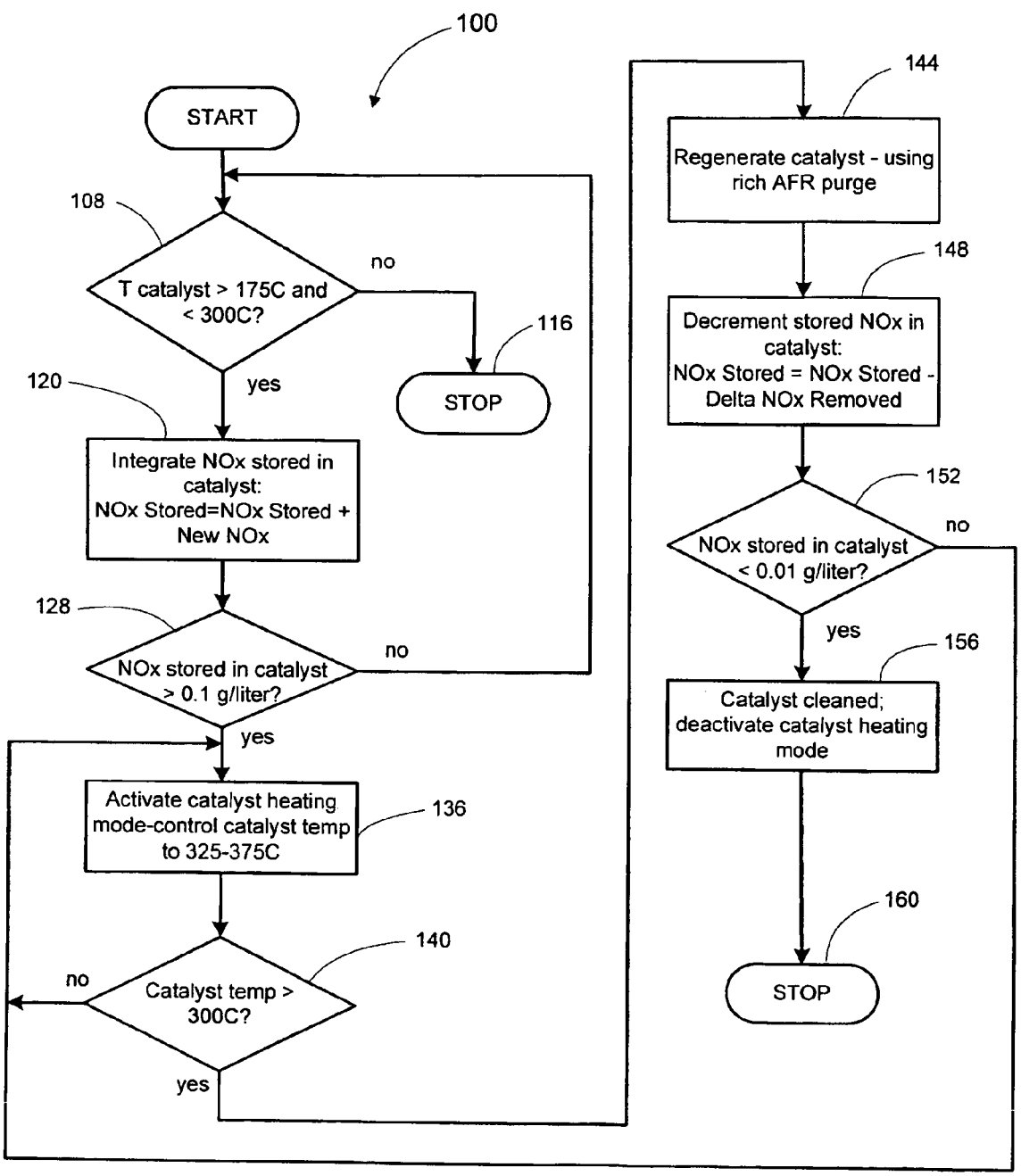
FIG. 2 is a flow diagram of a method of using a lean NOx trap (LNT) catalyst to control vehicle emission in accordance with one implementation of the present invention.

FIG. 2 is a flow diagram, indicated generally by reference number 100, of one implementation of a method of using the canisters 74 and 86 to control vehicle emission. The method 100 may be performed by the control module 42. In step 108, the control module 42 uses input from the temperature sensor 90 to determine whether a temperature of the LNT catalyst in canisters 74 and/or 86 is within a predetermined low temperature range. In the present implementation, a low range is, for example, between 175 C. and 300 C. The low temperature range may depend on a number of factors, including but not limited to LNT catalyst composition and density, sizes of the canisters 74 and 86, and/or fuel composition. It should be noted that catalyst temperature could be determined in other or additional ways and in other or additional locations, for example, using temperature sensor(s) alternative to or in addition to the sensor 90. It should also be noted that although LNT catalyst in the canisters 74 and 86 is referred to herein as a single catalyst, implementations are contemplated in which LNT catalyst in the canister 74 may differ from LNT catalyst in the canister 86.

Referring again to FIG. 2, if in step 108 it is determined that a temperature of the LNT catalyst is not within the predetermined low temperature range, then in step 116 the method 100 is terminated. If the LNT catalyst is within the low temperature range, then in step 120 the control module 42 increments, in a memory (not shown) of the control module 42, a variable "NOx Stored" representing a current total amount of NOx stored in the LNT catalyst. In a vehicle that does not include a NOx sensor, the variable "NOx Stored" may be used to monitor NOx concentration in the LNT catalyst. In one such configuration, NOx concentration levels are estimated at step 120 based on a cubic flow rate of air to the engine 22, an estimated time during which the LNT catalyst becomes saturated with NOx, and time between iterations of step 120. In the vehicle 20, exhaust is sensed by the NOx sensor 94. The control module 42 uses the NOx sensor signal to determine a current level of NOx and stores data indicating the current level in the variable "NOx Stored".

In step 128, the control module 42 determines whether the current level of NOx stored in the LNT catalyst exceeds a predetermined limit indicating that the LNT catalyst is substantially saturated with NOx. Such a limit may be indicated in various ways, depending, for example, on NOx sensor location(s) relative to the catalytic converter 68. In the exemplary vehicle 20, when a NOx concentration of 0.1 grams per liter is sensed, the LNT catalyst in the converter 68 is near or at saturation. The term "substantially saturated" thus is used to represent a degree of possible variance from total saturation that does not result in a change in the basic operation of implementations of the present invention.

If it is determined in step 128 that the LNT catalyst has not yet reached saturation, control returns to step 108. If it is determined in step 128 that the LNT catalyst has reached saturation, then in step 136 the LNT catalyst is heated to reach a temperature range predetermined to promote catalyst regeneration, e.g., between 300 C. and 350 C., between 325 C. and 375 C. or using other suitable ranges. To heat the catalyst, the control module 42 controls an air/fuel ratio of fuel delivered to the engine 22 via fuel pump 26 and injectors 32. Specifically, the control module 42 causes the fuel to be enriched, thereby increasing heat in the engine exhaust and in the LNT catalyst. Heating could be performed in other ways in other vehicle configurations, for example, using an energy source applied externally to the catalytic converter 68 or other part of the vehicle fuel system. Additionally or alternatively, fuel could be injected at another location, for example, into the exhaust manifold 70 for combustion in one of or both canisters 74 and 86.

In step 140 the control module 42 determines whether temperature of the LNT catalyst has reached the foregoing regeneration temperature range, e.g., exceeds 300 C. If the LNT catalyst has not reached 300 C., control returns to step 136. If the catalyst has reached 300 C., in step 144 the control module commences regeneration (also referred to as cleaning) of the LNT catalyst. The control module 42 enriches fuel delivered to the engine 22 and injects it in pulses to reduce NOx stored in the canisters 74 and 86.

In step 148, the control module 42 decrements the variable "NOx Stored" by an amount representing NOx removed from the LNT catalyst. In the vehicle 20, the control module 42 uses a signal from the NOx sensor 94 to determine a current level of NOx in the LNT catalyst. In another configuration, NOx reduction levels are estimated at step 148 based on a cubic flow rate of air to the engine 22, an estimated time period for regenerating the LNT catalyst, and time between iterations of step 148.

In step 152, the control module 42 determines whether the amount of NOx stored in the LNT catalyst is reduced to or below a limit indicating that the LNT catalyst is substantially regenerated, for example, 0.01 gram per liter. The term "substantially regenerated" is used to represent a degree of possible variance from total regeneration that does not result in a change in the basic operation of implementations of the present invention. If it is determined in step 152 that NOx concentration in the LNT catalyst has not yet reached such limit, control returns to step 136. If it is determined in step 152 that the LNT catalyst has been cleaned, then in step 156 heating of the LNT catalyst is deactivated. The method 100 is stopped in step 160.

Using the foregoing methods and system can improve the performance of LNT catalysts at low temperatures while promoting fuel economy. The foregoing method and system enables catalyst heating only when needed to ensure adequate catalyst performance. Since excessive heating of catalyst can result in substantial loss of vehicle fuel economy, selective heating can be important with respect to maintaining favorable fuel consumption characteristics. Vehicle fuel efficiency can be retained while the emission control potential of LNT catalysts is improved, particularly for vehicles that operate at low temperatures, for example, vehicles having diesel engines.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of using a lean NOx trap (LNT) catalyst to control vehicle engine emissions, said method comprising the steps of:
   while a temperature of the catalyst is within a predetermined temperature range that is less than an NOx conversion temperature of the catalyst, allowing the catalyst to store NOx and;
   determining an amount of NOx stored in the catalyst based on a NOx sensor signal;
   heating the substantially saturated catalyst to a temperature exceeding the low range when the amount stored exceeds a threshold; and
   regenerating the heated catalyst while monitoring amounts of NOx stored in the catalyst until the catalyst is substantially regenerated based on the NOx sensor signal.

2. The method of claim 1 wherein said step of regenerating the heated catalyst comprises maintaining a temperature of the catalyst above the low range until the catalyst is substantially regenerated.

3. The method of claim 1 wherein said heating and regenerating steps comprise operating the engine at a rich air-fuel ratio.

4. The method of claim 1 wherein the predetermined low temperature range comprises between 175 Celsius and 300 Celsius.

5. The method of claim 1 wherein said step of heating the substantially saturated catalyst comprises heating the catalyst to between 325 Celsius and 375 Celsius.

6. The method of claim 1 wherein said step of allowing the catalyst to store NOx until the catalyst is substantially saturated comprises determining whether NOx stored in the catalyst exceeds a predetermined density.

7. The method of claim 1 wherein said step of regenerating the heated catalyst comprises determining whether NOx stored in the catalyst is below a predetermined density.

8. A method of using a lean NOx trap (LNT) catalyst to control vehicle engine emissions, said method comprising the steps of:
   determining whether a temperature of the catalyst is in a predetermined temperature range that is less than a NOx conversion temperature of the catalyst;
   while the temperature of the catalyst is within the predetermined temperature range, determining whether the catalyst has adsorbed NOx to a level of substantial saturation based on a NOx sensor signal;
   based on said determining steps, heating the catalyst to above said temperature range to condition the catalyst for cleaning;
   cleaning the catalyst while tracking amounts of NOx still stored in the catalyst based on the NOx sensor signal.

9. The method of claim 8 wherein said heating step is repeated until the catalyst is substantially cleaned.

10. The method of claim 8 wherein said step of heating the catalyst comprises operating the engine at a rich air-fuel ratio.

11. The method of claim 8 wherein the predetermined low temperature range comprises between 175 Celsius and 300 Celsius.

12. The method of claim 8 wherein said step of determining whether the catalyst has adsorbed NOx to a level of substantial saturation comprises determining whether NOx stored in the catalyst exceeds a predetermined density.

13. A method of using a lean NOx trap (LNT) catalyst to control vehicle emissions, said method comprising the steps of:
   determining whether a temperature of the catalyst is in a predetermined temperature range that is less than a NOx conversation temperature of the catalyst;
   while the temperature of the catalyst is in the predetermined range, determining whether the catalyst has adsorbed NOx to a level of substantial saturation based on a NOx sensor signal;
   based on said determining step, heating the catalyst to a temperature above the predetermined low range to condition the catalyst for removal of the NOx; and
   regenerating the conditioned catalyst while monitoring amounts of NOx still stored in the catalyst based on the NOx sensor signal.

14. The method of claim 13 wherein the predetermined low temperature range comprises between 175 Celsius and 300 Celsius.

15. The method of claim 13 wherein said step of regenerating the conditioned catalyst comprises running the engine at a rich air-fuel ratio.

16. The method of claim 13 wherein said step of regenerating the conditioned catalyst comprises determining whether NOx stored in the catalyst is less than a predetermined density.

17. A vehicle emission control system comprising:
   a LNT catalyst that adsorbs NOx from an exhaust stream produced by an engine of the vehicle; and
   a control module of the vehicle that controls heating of the LNT catalyst;
   wherein said control module:
      while a temperature of said catalyst is within a predetermined temperature range that is less than a NOx conversion temperature of the catalyst,
      determines an amount of NOx stored in the catalyst based on a NOx sensor signal;
      heats said catalyst to a temperature exceeding the predetermined low range when the amount of NOx stored exceeds a threshold; and
      reduces the stored NOx from the heated catalyst while monitoring amounts of NOx remaining in the catalyst based on the NOx sensor signal.

18. The emission control system of claim 17 wherein said control module controls an air-fuel ratio to the engine, and wherein said control module changes the air-fuel ratio to perform at least one of heating said substantially saturated catalyst and reducing the stored NOx.

19. The emission control system of claim 17 wherein said control module removes the stored NOx until said catalyst is substantially regenerated.

* * * * *